Emmeline Pye
Inventor.

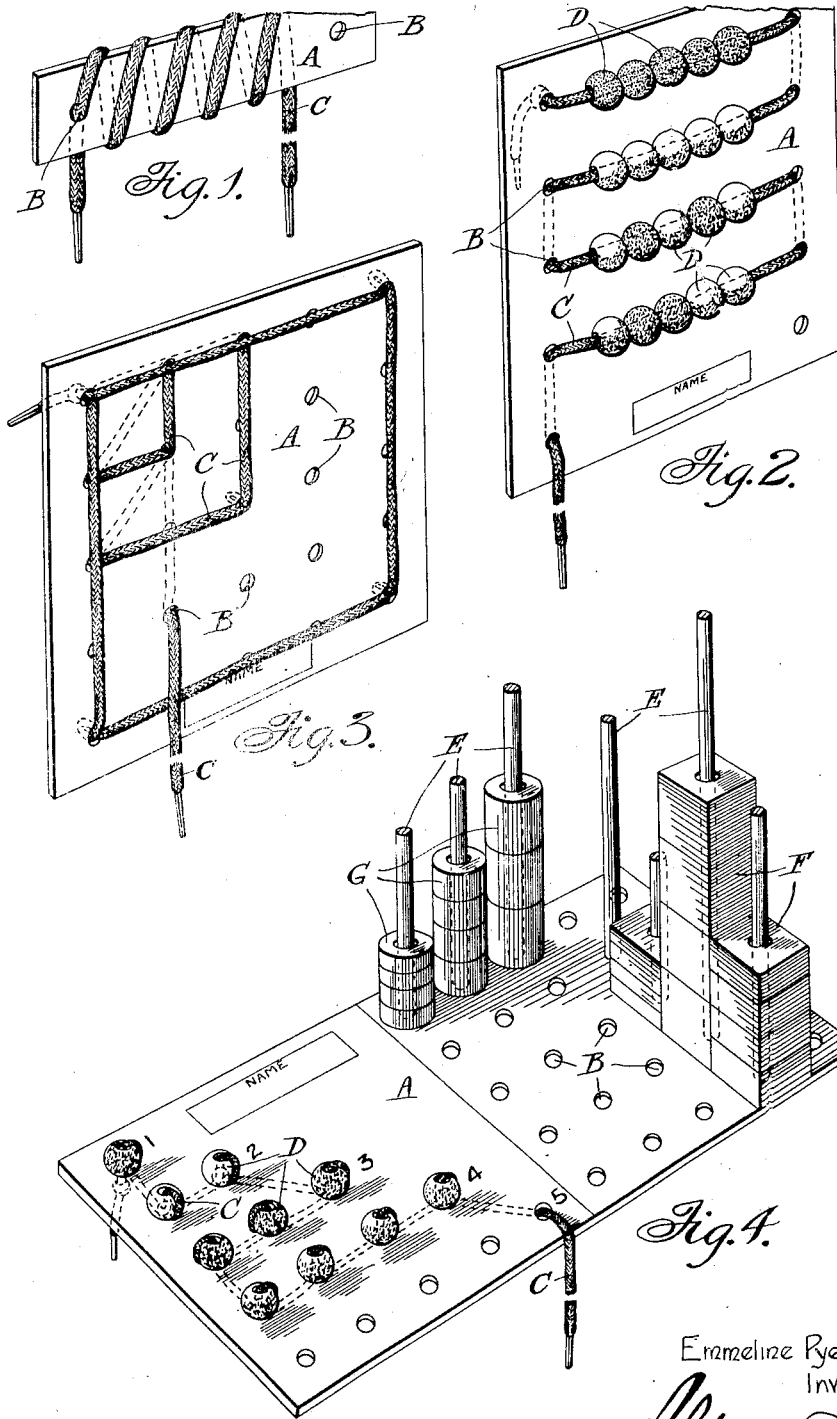

By Attorney.

E. PYE.
COMBINATION OF DEVICES FOR TEACHING INFANTS.
APPLICATION FILED SEPT. 1, 1917.

1,329,850.  Patented Feb. 3, 1920.

Emmeline Pye
Inventor
By
Attorney.

UNITED STATES PATENT OFFICE.

EMMELINE PYE, OF TOORAK, VICTORIA, AUSTRALIA, ASSIGNOR TO CHARLES BENEDICT DE BIBRA, TRADING AS THE EDUCATIONAL SUPPLY ASSOCIATION, OF MELBOURNE, AUSTRALIA.

COMBINATION OF DEVICES FOR TEACHING INFANTS.

1,329,850.     Specification of Letters Patent.     Patented Feb. 3, 1920.

Application filed September 1, 1917. Serial No. 189,398.

*To all whom it may concern:*

Be it known that I, EMMELINE PYE, a subject of the King of Great Britain, residing at 200 Toorak road, Toorak, in the State of Victoria, Commonwealth of Australia, have invented certain new and useful Improvements in an Improved Combination of Devices for Teaching Infants, of which the following is a specification.

This invention relates to an improved combination of devices for use in teaching children and infants and is directed to the provision of constructional units which may be used with advantage by children when indulging in play to initiate and develop their mental growth and manual dexterity.

The object of this invention is to provide a combination of simple devices which can be easily arranged by a child to form a variety of geometrical and constructional designs whereby mental impressions of geometric figures and constructive principles will be readily produced on its mind that will be both amusing and instructive.

I accomplish this object by providing a series of cards of different sizes and shapes having one or more perforations therein and cords, laces or ribbons which are adapted to be threaded through the perforations and wound or twisted around the same or interlaced to form various designs of an attractive nature. The edges of the cards may be provided with regularly shaped indentations to facilitate the correct winding of the cords, laces or ribbons and the edges may be curved or rolled as desired. The ends of the cords, laces or ribbons, are provided with tags or like means to facilitate their being passed through the perforations, and beads or the like, of a different size and color may be threaded on the cords, laces or ribbons, to vary the geometrical designs formed on the cards.

A number of straight sticks of different sizes and shape are provided by means of which various constructional designs can be formed. The ends of the sticks are adapted to be inserted in the perforations in the cards and some or all of the blocks can be perforated to permit of their being threaded over the sticks to insure stability and symmetry of construction.

In order that this invention may be better understood I will now proceed to describe the same with reference to the accompanying drawings in which Figure 1 is a perspective view of the first or simplest card of the series illustrating one of the uses thereof with laces.

Fig. 2 is a perspective view of the second card showing the use thereof with laces and beads.

Fig. 3 shows the third card of the series.

Fig. 4 shows the fourth card of the series illustrating on the one part the use thereof with shoelaces and beads and on the other part sticks and blocks of different sizes and shapes.

Figure 5:
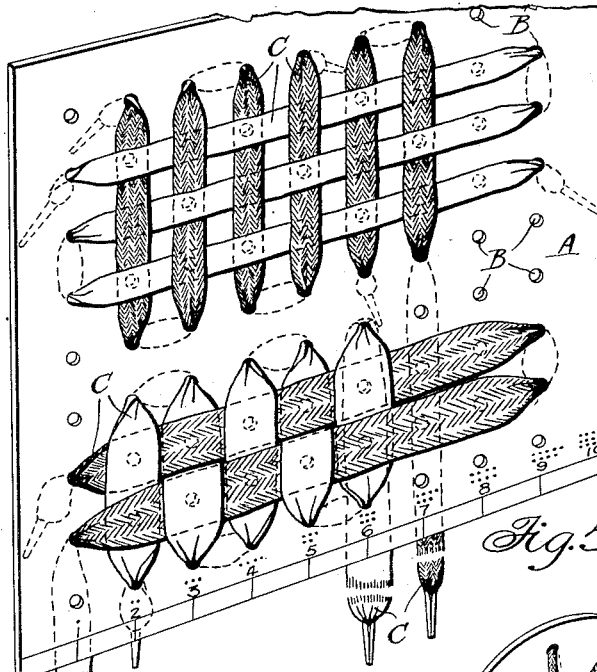
Fig. 5 shows the fifth card of the series and illustrates the use thereof with shoelaces of wider pattern for weaving.

The different cards in the series as illustrated in Figs. 1 to 5 are preferably made with the perforations in multiples of 5 being one inch apart from center to center.

The first card in the series as illustrated in Fig. 1 consists of a card A having two perforations B one at each end the same being adapted for use with a lace C which is passed through one perforation and then simply wound thereon, thereby teaching the child the use of accurate spacing and alinement and training its mind in the direction of regularity. If desired the cards may be made with indentations upon the edges so that, in the winding of the lace thereon it may be passed into the grooves or indentations and the child thereby assisted in placing the windings in correct alinement.

The card illustrated in Fig. 2 is the second of the series and is preferably made five inches square, there being a series of five perforations upon opposite sides being set one inch apart from center to center. This card A is also used in combination with shoelaces C which may be threaded through the perforations B and any pattern or design worked thereon. This view also illustrates the manner in which the cards A may be used with the laces C in combination with beads D which of course may be of different colors and sizes.

In Fig. 2 the card is shown with the beads thereon in such a way that the whole may be used as an abacus for initiating in the child's mind the art or theory of counting.

Fig. 3 illustrates the third card of the series which is also five inches square with five rows of perforations B of five each, the perforations being set one inch apart from center to center. This card is especially adapted for forming with shoelaces C a wide variety of patterns and designs and rectangular shapes.

In Fig. 4 the fourth card of the series is shown which is made oblong in shape being ten inches upon one side and five inches on the other, the same being divided into two sections, that upon the left side having perforations arranged in lines in arithmetical progression. The other section has twenty-five perforations arranged in five rows of five each similar to card No. 3. The left hand section of the card may be used with shoelaces for working out patterns or in combination with beads D as shown when the beads may be threaded thereon showing the method of teaching consecutive numbers. On the right hand side of the card is shown the combination therewith of sticks E of different lengths together with rectangular blocks F and cylindrical blocks G. Both these blocks F and G are formed with a hole or perforation in the center so that they may be threaded on to the aforesaid sticks. The sticks E are of lengths which are different multiples of unit length so that the mind of the child is trained in relative proportions while further the blocks F and G are similarly made of different definite proportions. For instance the blocks F are shown as being cubular and half cube and quarter cube while the cylindrical blocks G are made of such sizes that the depth is equal to the diameter, half the diameter, and quarter the diameter.

Figure 8:
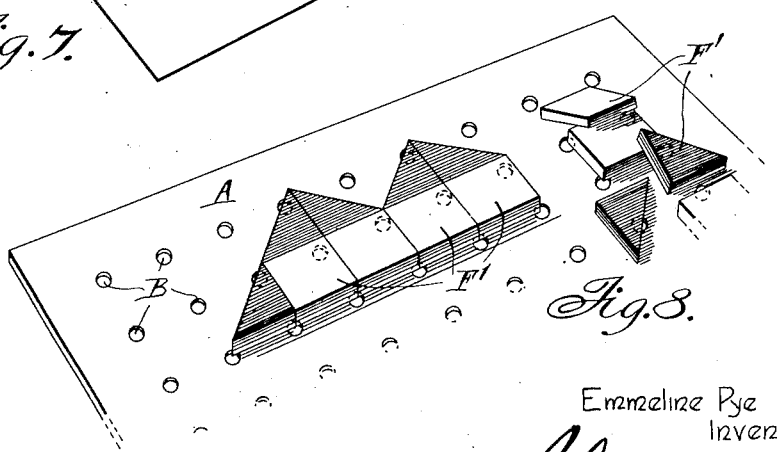
Fig. 8 illustrates the use of the fifth card of the series with blocks of different shapes for parquetry work and like operations.

The fifth card of the series is shown in Fig. 5 and is made ten inches square with nine rows of perforations B of nine each. This card may be used in a similar manner to the cards previously illustrated in combination with bootlaces C whereby any designs of rectangular shapes may be woven thereon and also used in combination with the beads as illustrated in Fig. 2 on the left hand side of Fig. 4 or with the sticks and blocks as illustrated on the right hand side of Fig. 4. This card may further be used in combination with a wide flat shoelace as shown whereby the art of weaving may be introduced, such shoelaces being of different colors for incorporation of different designs and patterns. The card illustrated in Fig. 5 may also be used in combination with blocks F' as illustrated in Fig. 8 for parquetry work.

Figure 6:
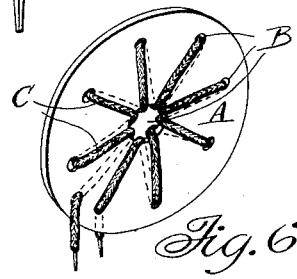
Fig. 6 shows a round card and the use thereof with shoelaces.

The card illustrated in Fig. 6 is made round in shape having a central perforation of larger size with a number of perforations around the edge thereof set in such relation that by being used in combination with shoelaces radial patterns may be worked as shown.

Figure 7:
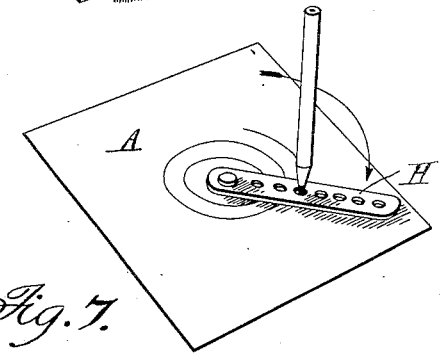
Fig. 7 illustrates the use with a card of a pivoted member having a number of perforations which may be used with a lead pencil or the like for scribing circles or like figures.

In Fig. 7 is shown a device for scribing or working circular lines or patterns, the same consisting of a piece of cardboard H having a number of perforations and is adapted to be attached to the card by means of a paper fastener or the like and used with a pencil as indicated.

Figure 9:
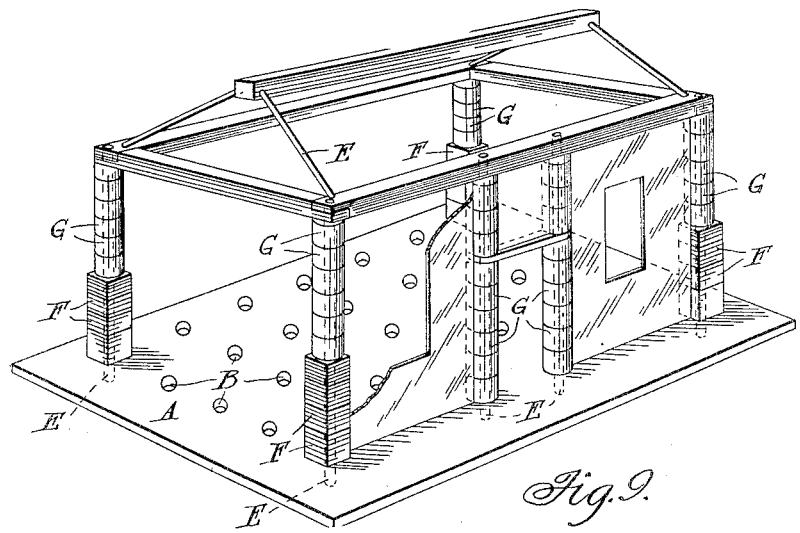
Fig. 9 is a perspective view of a card and shows the manner of using sticks and blocks therewith as a toy to form a representation of a building and like structures.
Figure 10:
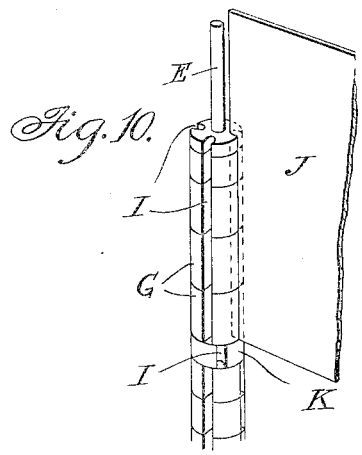
Figs. 10 and 11 are detail views of the sticks and blocks the latter being shown with grooves to take the edges of pieces of cardboard.
Figure 11:
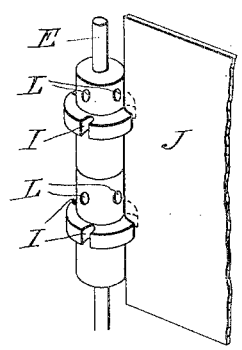

Fig. 9 of the drawings illustrates the use of a card A in combination with the sticks E and blocks F and G to form an attractive and amusing toy by the aid of which a child can exercise his constructive ability in forming representations of buildings and like structures. In this instance the sticks are inserted upright in the perforations in the card and the blocks are threaded thereover to form supporting columns for other units employed in forming the representations desired. The blocks F and G are formed with longitudinally disposed grooves I which are adapted to receive and support the edges of pieces of card board J or like material employed to form the walls or other parts of the structure represented by any particular arrangement of the parts of the toy. The pieces of card board J can be supported at any point in the height of the columns by partially rotating one of the blocks to break the continuity of the grooves I as shown at K in Fig. 10 of the drawings. If preferred, holes L can be formed diametrically in the blocks F and G as shown in Fig. 11 to support the sticks E in a radial direction or to permit of them being threaded sidewise on the said sticks.

In order to permit of the devices being packed compactly and transported conveniently they are placed in wooden or cardboard boxes the lid or any of the sides of which can be provided with a series of perforations arranged as hereinbefore described and used in the same manner as the cards A in combination with the other units comprised in the invention.

I claim

1. A device for use in teaching comprising a card provided with a plurality of perforations adapted to receive a lace to be passed through said perforations to form designs on the surface of the card, sticks adapted to have their lower ends inserted in the perforations when the lace is not occupying the perforations, and a series of different sized perforated blocks adapted to be mounted on each of said sticks.

2. A combination of devices for use in teaching comprising a card having a plurality of perforations therein, sticks having their lower ends removably arranged in said perforations, and a plurality of perforated blocks of different sizes and shapes mounted removably on each of said sticks.

3. A combination of devices for use in teaching comprising a card having a number of perforations therein, a plurality of sticks having their lower ends removably mounted in the perforations, a series of perforated blocks mounted on each of said sticks and having peripheral grooves forming recesses and card board plates having their edges resting in said recesses, one of said blocks on one of the sticks having its groove arranged out of alinement with the grooves in the remainder of the blocks on said stick to form a ledge upon which a card board plate may rest.

4. A combination of devices for use in teaching children and infants comprising a series of cards having a number of perforations therein, a plurality of sticks of different lengths, a series of perforated blocks of different shapes and sizes and one or more grooves formed longitudinally in the sides of the blocks constructed and arranged whereby the sticks can be inserted in the perforations to support the blocks and pieces of cardboard can be slipped into and supported by the grooves in said blocks, substantially as described and for the purposes herein set forth.

5. The combination with a stick, of a block removably mounted on said stick and having a peripheral groove and a radial aperture, and a card having its edge resting in said grooves.

In testimony whereof I have signed my name to this specification in the presence of two subscribing witnesses.

EMMELINE PYE.

Witnesses:
  I. W. CULLEN,
  L. GREEN.